US010958538B2

United States Patent
Burke et al.

(10) Patent No.: US 10,958,538 B2
(45) Date of Patent: Mar. 23, 2021

(54) SYMMETRIC COHERENT REQUEST/RESPONSE POLICY ENFORCEMENT

(71) Applicant: International Business Machines Corporation, Armonk, NY (US)

(72) Inventors: Thomas C. Burke, Durham, NC (US); Mario E. De Armas, Wellington, FL (US); Oswaldo Gago, Margate, FL (US); Ramon M. Spence, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/740,681

(22) Filed: Jan. 13, 2020

(65) Prior Publication Data

US 2020/0153708 A1    May 14, 2020

Related U.S. Application Data

(63) Continuation of application No. 16/102,673, filed on Aug. 13, 2018, now Pat. No. 10,574,543, which is a
(Continued)

(51) Int. Cl.
*G06F 15/173* (2006.01)
*H04L 12/24* (2006.01)
(Continued)

(52) U.S. Cl.
CPC ...... *H04L 41/5019* (2013.01); *H04L 41/0893* (2013.01); *H04L 41/5003* (2013.01);
(Continued)

(58) Field of Classification Search
CPC ............. H04L 41/5019; H04L 41/0893; H04L 41/5003; H04L 41/5022; H04L 41/5093;
(Continued)

(56) References Cited

U.S. PATENT DOCUMENTS 6,502,131 B1   12/2002 Vaid
6,651,101 B1 * 11/2003 Gai ........................ H04L 47/20
                                               709/224
(Continued)

OTHER PUBLICATIONS

List of IBM Patents or Patent Applications Treated as Related. Filed Herewith. 2 pages.

*Primary Examiner* — Bharat Barot
(74) *Attorney, Agent, or Firm* — Christopher M. Pignato

(57) ABSTRACT

A set of service level agreement (SLA) policies and service level definition (SLD) policies that are applied to a request message of a correlated request/response message pair are tracked. A response message of the correlated request/response message pair is detected. A corresponding set of platform-specific policy enforcement processing rules that are used to enforce the set of SLA policies and SLD policies on the response message are identified using the tracked set of SLA policies and SLD policies applied to the request message. The set of SLA policies and SLD policies are enforced on the response message using the identified corresponding set of platform-specific policy enforcement processing rules.

18 Claims, 7 Drawing Sheets

Related U.S. Application Data continuation of application No. 15/445,338, filed on Feb. 28, 2017, now Pat. No. 10,084,667, which is a continuation of application No. 15/164,532, filed on May 25, 2016, now Pat. No. 9,628,337, which is a continuation of application No. 14/175,002, filed on Feb. 7, 2014, now Pat. No. 9,379,998.

(51) Int. Cl.
| | | |
|---|---|---|
| *H04L 12/917* | (2013.01) | |
| *H04L 29/06* | (2006.01) | |
| *H04L 12/813* | (2013.01) | |
| *H04L 12/851* | (2013.01) | |

(52) U.S. Cl.
CPC ...... *H04L 41/5006* (2013.01); *H04L 41/5022* (2013.01); *H04L 41/5093* (2013.01); *H04L 47/20* (2013.01); *H04L 47/2433* (2013.01); *H04L 47/76* (2013.01); *H04L 63/20* (2013.01)

(58) Field of Classification Search
CPC ..... H04L 47/20; H04L 47/2433; H04L 47/76; H04L 63/20
USPC .................................. 709/223–224, 225–226
See application file for complete search history.

(56) References Cited

U.S. PATENT DOCUMENTS

| | | |
|---|---|---|
| 7,290,028 B2 | 10/2007 | Brabson |
| 7,607,164 B2 | 10/2009 | Vasishth |
| 7,802,144 B2 | 9/2010 | Vinberg |
| 7,962,582 B2 | 6/2011 | Potti |
| 8,285,827 B1 | 10/2012 | Reiner |
| 8,498,959 B2 | 7/2013 | Almeida |
| 8,806,018 B2 | 8/2014 | Harchol-Balter |
| 9,379,998 B2 | 6/2016 | Burke |
| 9,628,337 B2 | 4/2017 | Burke |
| 9,710,664 B2 | 7/2017 | Sathyadevan |
| 9,742,631 B2 | 8/2017 | Burke |
| 10,084,667 B2 | 9/2018 | Burke |
| 2002/0174227 A1 | 11/2002 | Hartsell |
| 2002/0188720 A1 | 12/2002 | Terrell |
| 2005/0289244 A1* | 12/2005 | Sahu .................. H04L 67/2819 709/225 |
| 2008/0047016 A1 | 2/2008 | Spoonamore |
| 2010/0146037 A1 | 6/2010 | Little |
| 2013/0173497 A1* | 7/2013 | Gould .................. H04L 61/302 709/223 |
| 2014/0181312 A1 | 6/2014 | Rutten |
| 2015/0109967 A1* | 4/2015 | Hogan ................ H04L 41/5022 370/259 |
| 2015/0207813 A1 | 7/2015 | Reybok |
| 2015/0229538 A1 | 8/2015 | Burke |
| 2015/0229539 A1 | 8/2015 | Burke |
| 2016/0269243 A1 | 9/2016 | Burke |
| 2017/0171027 A1 | 6/2017 | Burke |
| 2017/0302538 A1 | 10/2017 | Burke |
| 2019/0007281 A1 | 1/2019 | Burke |
| 2019/0349258 A1* | 11/2019 | Xia ..................... H04L 41/0893 |
| 2020/0045770 A1* | 2/2020 | Hu ...................... H04L 41/0893 |

\* cited by examiner

SYMMETRIC COHERENT REQUEST/RESPONSE POLICY ENFORCEMENT

BACKGROUND

The present invention relates to policy enforcement within messaging environments. More particularly, the present invention relates to symmetric coherent request/response policy enforcement.

A service level agreement (SLA) represents a consumer-based agreement for services formed between a consumer and a service provider. An SLA may represent an agreement regarding sending and/or receiving a particular number of messages per time period, an agreement regarding a quality of service (e.g., bandwidth) for message throughput, or other form of consumer messaging agreement. A service level definition (SLD) represents a service-based policy that protects service provider infrastructure access and utilization constraints. An SLD may be utilized to protect infrastructure from accesses by non-contracting entities for which an SLA has not been established, to control resource utilization to prevent service degradation, or other form of service level constraint.

SUMMARY

A method includes tracking, by a processor, a plurality of service level agreement (SLA) policies and service level definition (SLD) policies applied to a request message of a correlated request/response message pair; detecting a response message of the correlated request/response message pair; identifying, using the tracked plurality of SLA policies and SLD policies applied to the request message, a corresponding plurality of platform-specific policy enforcement processing rules used to enforce the plurality of SLA policies and SLD policies on the response message; and enforcing the plurality of SLA policies and SLD policies on the response message using the identified corresponding plurality of platform-specific policy enforcement processing rules.

A system includes a memory; and a processor programmed to: track, within the memory, a plurality of service level agreement (SLA) policies and service level definition (SLD) policies applied to a request message of a correlated request/response message pair; detect a response message of the correlated request/response message pair; identify, using the tracked plurality of SLA policies and SLD policies applied to the request message, a corresponding plurality of platform-specific policy enforcement processing rules used to enforce the plurality of SLA policies and SLD policies on the response message; and enforce the plurality of SLA policies and SLD policies on the response message using the identified corresponding plurality of platform-specific policy enforcement processing rules.

A computer program product includes a computer readable storage medium having computer readable program code embodied therewith, where the computer readable program code when executed on a computer causes the computer to: track a plurality of service level agreement (SLA) policies and service level definition (SLD) policies applied to a request message of a correlated request/response message pair; detect a response message of the correlated request/response message pair; identify, using the tracked plurality of SLA policies and SLD policies applied to the request message, a corresponding plurality of platform-specific policy enforcement processing rules used to enforce the plurality of SLA policies and SLD policies on the response message; and enforce the plurality of SLA policies and SLD policies on the response message using the identified corresponding plurality of platform-specific policy enforcement processing rules.

DETAILED DESCRIPTION

Figure 1:
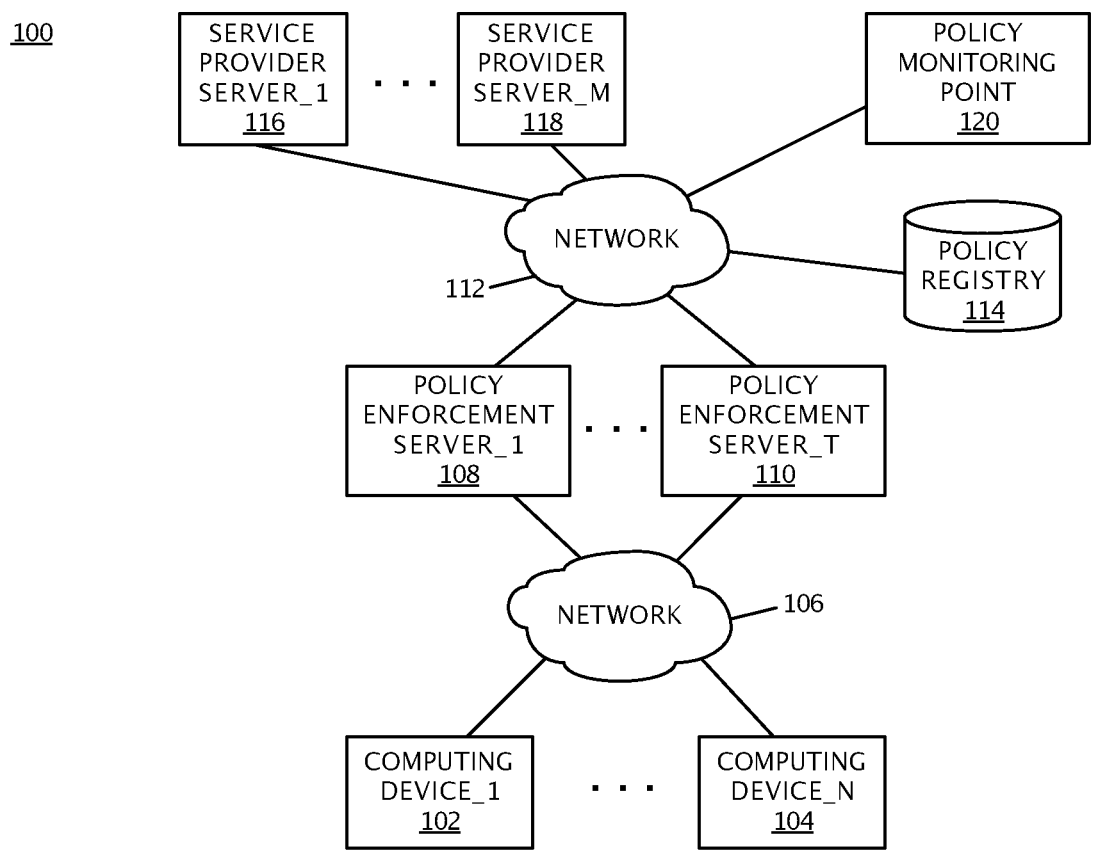
FIG. 1 is a block diagram of an example of an implementation of a system for symmetric coherent request/response policy enforcement according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides symmetric coherent request/response policy enforcement. As described in more detail below, the present technology tracks policy enforcement actions that are applied to a request message of a correlated request/response message pair. The tracked policy enforcement actions include a set of consumer-based service level agreement (SLA) policies and service provider-based service level definition (SLD) policies, and any associated policy alternatives of the respective policies, that are applied to a request message. The present technology uses the tracked set of SLA policies and SLD policies, and any policy alternatives, that were applied to the request message to apply and enforce the same set of SLA policies and SLD policies (and the same policy alternatives) to the correlated response message. As such, the present technology provides symmetric and coherent enforcement of polices and policy alternatives to correlated request/response message pairs to ensure that the correct policies are applied to the correlated response message without additional overhead. Additionally, correct policy alternatives that previously may not be known at a time of policy enforcement on a response message may be enforced. Accordingly, improved policy enforcement processing may be provided by the technology described herein.

As described in more detail below, the present technology provides symmetric and coherent management of request and response policy enforcement message flows to enforce both SLDs and SLAs of correlated request/response message pairs. For purposes of the present description, it should be noted that a transactional message and the associated policy enforcement message flow may result in enforcement of multiple SLDs and multiple SLAs on the respective message. It should further be noted that SLDs and SLAs may each potentially include policy alternatives from which one alternative is selected for enforcement on the request message along the policy enforcement message flow path. The present technology correlates policies (and alternatives) that are enforced on a request message with corresponding policies that are to be enforced for an associated response message or a potential fault response, as described in more detail below. As such, the present technology also provides coherent enforcement of policy on either a response message or a fault response sent by a service back end system.

The terms "symmetric," "coherent," and "symmetric coherent" are used interchangeably herein. As used herein with respect to policy enforcement, these interchangeable terms refer to correlation of sequences of SLA and SLD policy enforcement actions between a request message flow and a response message flow (including any enforced alternatives). As such, symmetric coherent request/response policy enforcement refers to associating a series of executed request message policy enforcement actions with an appropriate (e.g., opposite, inverse, or complementary) series of response message policy enforcement actions, where the order of processing of the two series of policy enforcement actions is correlated to ensure an appropriate application of the respective policies to both messages. The series of response message policy enforcement actions may be performed in an opposite order of the request message policy enforcement actions to provide a symmetric (e.g., mirrored) policy enforcement processing sequence.

For example, a security policy may mandate that if a request message is encrypted, then encryption of the response message may be the appropriate symmetric policy enforcement action. Alternatively, the security policy may mandate that if the request message is digitally signed, then digitally signing the response message may be the appropriate symmetric policy enforcement action. Further, where a request message is both digitally signed and encrypted, policy enforcement actions on the request message may include validating the digital signature and decrypting the request message as part of policy enforcement. Symmetric coherent request/response policy enforcement, as applied to this example, refers to performing the appropriate symmetric policy enforcement actions on the specific response message that is associated/paired with the request message, specifically encryption of the response message (the complementary action to decryption of the request message) and digitally signing the response message (the complementary to validation of the digital signature of the request message). It should be noted that the symmetric coherent request/response policy enforcement described herein provides policy enforcement on the response message that is applied in a reverse order of the associated policy enforcement applied to the request message. As an alternative to the above example implementation/embodiment, it should be noted that no particular order is required for unwinding a symmetric policy enforcement context. Further, no particular order is required with respect to ordering of processing of the SLDs relative to the associated SLAs. Any permutation of the respective processing ordering possibilities may be used as appropriate for the given implementation. Accordingly, for purposes of the present description, any "prescribed order" or "prescribed sequence" of processing the respective policies and/or policy enforcement processing rules/actions that is appropriate for a given implementation may be used.

Accordingly, symmetric coherent request/response policy enforcement may involve symmetric and complementary physical processing of a series of policy enforcement actions on the respective request and response messages to provide policy enforcement of the response message that coherently complies with (e.g., mirrors) policy enforcement applied to the request message. Further, symmetric coherent request/response policy enforcement as used herein also refers to complementary sequences of SLA and SLD processing on the respective request and response message pair. The complementary sequences of SLA and SLD actions may be performed in an opposite order of processing on the response message relative to a sequence of policy enforcement actions on the request message.

It is understood that many other permutations of policy enforcement are possible, and all such permutations are considered to be within the scope of the present technology. As such, a different order of processing of the policy enforcement actions on the response message may be implemented if appropriate for a given implementation. Accordingly, the preliminary examples above are intended to provide a foundation for interpretation of the higher-level description that follows, prior to the description of the detailed examples provided further below.

It should additionally be noted that for purposes of the present description, the terms "fault message" and "fault response" as used herein represent an application-level (e.g., back-end service) fault response to a request message rather than a fault/error generated within a network due to policy enforcement. A fault message may be generated, for example, in response to a number being out of range for a particular request, or other issue associated with a request. The present technology coherently enforces policies on fault responses from a back-end service as defined herein (and as opposed to an error condition such as a resource not being available or a time-out condition).

Regarding correlation of request messages with response messages, request messages may be correlated with response (or fault response) messages using a transaction identifier or other form of message identifier that allows identification of the correct response or fault message upon which to perform the symmetric coherent request/response policy enforcement described herein. As such, it should be understood that any technology usable to correlate individual messages within a message processing environment may be utilized, as appropriate for a given implementation. Accordingly, it should further be understood that individual request messages may be directly correlated with individual response messages or resulting fault response messages within message processing environments that have a small number or potentially thousands of outstanding active messaging transactions at any point in time.

Policy enforcement may be performed, for example, at a policy enforcement point (PEP). Each type of PEP may provide different "native" constructs (e.g., policy enforcement processing rules) that represent implementations of defined policies and alternatives for the particular PEP platform. As such, the native constructs or policy enforcement processing rules may be considered platform-specific implementations of policy actions that enforce the respective policies on the particular PEP platform. The present technology provides real-time processing on the respective PEP platforms to ensure that the correct native constructs for the particular PEP platform are coherently correlated between the request and response message flows.

The present technology monitors/tracks and documents request flow path policy enforcement information for a request message. The request flow path policy enforcement information identifies and documents which SLDs, which SLAs, and which policy alternatives (if selected) are used to enforce the policies designated to be enforced for the particular message, and documents the order of processing of the respective policy enforcement actions. This request flow path policy enforcement information is stored within a symmetric policy enforcement context structure for each request/response message pair. A new symmetric policy enforcement context structure is constructed and stored for each request/response message pair during the request message processing. The symmetric policy enforcement context structure is utilized to symmetrically and coherently enforce the appropriate policies on the correlated response (or fault) message. As such, the symmetric policy enforcement context structure represents "context" (e.g., information) that is useable for enforcement of policies on the response message that is correlated with the request message. The symmetric policy enforcement context structure may alternatively be referred to as a "symmetric policy enforcement context" for convenience within the description that follows.

Further regarding enforcement of policy on a PEP, the platform-specific/native constructs that are defined in association with the respective PEP device are selected to enforce defined policies (SLDs and SLAs) and any defined policy alternatives for the request message along the request message flow path. This series of native constructs as applied to the request message is documented and stored within the symmetric policy enforcement context structure for the particular request/response message pair during the request message flow.

The stored symmetric policy enforcement context structure captured during the request message flow is used during the response message flow to directly identify and select the complementary/symmetric coherent policy enforcement actions that are performed on the response (or fault response) message. As such, the policy enforcement information captured within the symmetric policy enforcement context structure at the time of policy enforcement of the request message provides information usable to directly identify the appropriate policy actions to enforce on the correlated response message.

For purposes of the remainder of the present description, the parenthetic inclusion of the fault response or fault message (e.g., "or fault response" as utilized above) during reference to a response message will generally be omitted in favor of readability. However, it is understood that policy enforcement may be applied coherently/symmetrically to either a response message or a fault response message from a service depending upon which is returned from a back-end processing platform in response to the respective request message. Further, the terms "native constructs," "policy enforcement processing rules," "processing rules," and "rules" will be used interchangeably herein. It is understood that these terms refer to platform-specific implementations of processing actions that implement and enforce specific policies and policy alternatives. Further, it is understood that these rules may be implemented as granularly or as coarsely as appropriate for the given PEP platform and its implementation, and the particular policy to be enforced.

Further regarding the response message flow, as described above and in more detail below, the present technology uses the stored symmetric policy enforcement context structure captured during policy enforcement actions on the request message flow to process the correlated response message during the response message flow path. Using the stored symmetric policy enforcement context structure, the present technology coherently selects complementary processing rules as implemented by the respective PEP platform to enforce the appropriate policies and any policy alternatives that symmetrically map to the tracked native constructs that were selected and used during the request message flow path to enforce policies on the request message. As such, the present technology provides symmetric and coherent policy enforcement for correlated request and response message pairs.

For purposes of the present description, is understood that the respective PEP platform may include a mapping between policies and the appropriate native constructs designated on that particular platform to process request messages, response messages, and fault response messages. As such, the PEP platform may identify the appropriate native constructs for processing of any message for which a particular policy is to be enforced (request, response, or fault response) from the identification of the respective policies or policy alternatives. The examples of the symmetric policy enforcement context structure herein leverage this internal mapping of policies and policy alternatives to native constructs. However, it should be understood that native constructs may be captured directly within a symmetric policy enforcement context structure if appropriate for a given implementation with appropriate mapping implemented between native constructs used to enforce request message policy and native constructs implemented to perform complementary response or fault response message processing.

The symmetric policy enforcement context structure is built as policies are enforced for the request message, and this information is stored in a construct/structure that is available for the lifetime of a transactional message pair. The symmetric policy enforcement context described herein may be constructed and stored within a stand-alone construct/structure for each request/response message pair. Within such an implementation, the symmetric policy enforcement context structure may be identified using the transaction identifier of the request/response message pair or other identifier as appropriate for the given implementation. Alternatively, the symmetric policy enforcement context may be added to (e.g., overloaded within) an existing transactional message context created to manage the respective request/response message pair throughout the transaction. Within such an implementation, the transactional message context may document the transaction identifier initially assigned to the request/response message pair and may document other higher-level information related to the transaction. The symmetric policy enforcement context may be stored as a structure within a memory in any appropriate manner that makes it available to the respective policy processing engine for the correlated response message flow. For example, the symmetric policy enforcement context may be stored within a programming language structure (e.g., array, table, etc.), may be stored within an extensible markup language (XML) document, or may be stored otherwise as appropriate for a given implementation.

Regarding policy and policy alternative identification within the symmetric policy enforcement context, each policy alternative associated with a particular policy may be translated on the respective PEP platform into three (3) processing rules/native constructs: a request message processing rule (e.g., "rulename-req" rule), a response message processing rule (e.g., "rulename-process-resp" rule), and a fault processing rule (e.g., "rulename-process-fault" rule). This may be the case even where the respective assertion does not operate on all message flows. It should be noted that all three rules may be named to share the same prefix (e.g., "rulename" in the present example), and this shared prefix identifies the policy to which the native constructs are mapped. It should further be noted that alternative forms of correlation and identification of policy enforcement actions may be implemented, such as use of a data structure with pointer referencing to the data structure or individual policy enforcement actions within the data structure where a compiled or interpreted programming language is utilized (e.g., the C/C++ programming language(s)). As such, any form of identification and organization of policy enforcement actions may be utilized, and all such forms of identification and organization of policy enforcement actions are considered within the scope of the present subject matter.

As each request processing rule is executed to enforce policies on the request message, the symmetric policy enforcement context may be updated with three pieces of information: the rule prefix, an indication of whether the rule is enforcing an SLA or an SLD, and an indication of whether the processing rule is an alternative (and which alternative of the available alternatives the processing rule represents). The indication of whether a policy alternative has been executed to enforce the policy and the respective identifier of each enforced policy alternative may be documented in any manner appropriate for the given implementation, such as a hyphenated post fix (e.g., "-3" for alternative three), or other form of indication. However, while the present description utilizes rule naming to identify policy enforcement actions and sequences, it should be noted that any form of identification and organization of policy enforcement actions that allows individual identification of the respective policy, whether the policy is enforced as an SLA or SLD, and whether an alternative of a policy was enforced may be utilized, such as programming constructs associated with compiled or interpreted programming languages. Accordingly, all such forms of identification and organization of policy enforcement actions, and alternatives, are considered within the scope of the present subject matter.

Regarding syntactic choices for tracking execution of policies within a symmetric policy enforcement context, it should further be noted that SLDs may have associated SLAs, as described within a detailed example further below. As such, an alternative for tracking the three pieces of information within the symmetric policy enforcement context would be to name both the SLD policy enforcement processing rules and the associated SLA policy enforcement processing rules with the same common prefix, and then to append an indication of whether the particular processing rule implements enforcement of an SLA (and/or append an indication of whether the particular processing rule implements enforcement of an SLD, as appropriate for a given implementation). As described above, policy alternatives may be identified, such as a hyphenated post fix (e.g., "-3" for alternative three), or other form of indication. Within this form of implementation, as the respective policy enforcement processing rules are executed to enforce policies on the request message, all three pieces of information may be captured directly from the policy enforcement processing rule names to provide the symmetric policy enforcement context that may be used to symmetrically enforce policies on the correlated response message of the respective request/response message pair.

Based upon the information captured within the symmetric policy enforcement context during the request message flow, the appropriate symmetric response message or fault response message processing rules for the correlated response or fault response message, respectively, may be directly identified and selected from the symmetric policy enforcement context using the rule prefix, alternative identifier, and the SLA/SLD identifier. As such, the documentation and tracking of policy context/information within the symmetric policy enforcement context captured during the request message flow provides a runtime policy enforcement optimization that avoids additional processing (e.g., rule lookup) during the response message flow.

For purposes of the present description, capturing the processing rule information within the symmetric policy enforcement context during the request message flow may be considered and referred to as "spooling" or "winding up" a processing rule series/sequence that documents the appropriate policies to be enforced for the respective request/response message pair. Conversely, processing the paired response message using the captured symmetric policy enforcement context during the response message flow may be considered and referred to as "un-spooling" or "unwinding" the processing rule selection context. As such, efficient policy enforcement may be obtained by spooling and un-spooling policy enforcement actions, and symmetric policy enforcement consistency may be improved. Further, the captured/documented ordering of processing rules applied to the request message within the symmetric policy enforcement context also captures/documents in reverse order the processing rules to be selected and applied to the response message.

Additionally, where a particular policy and/or alternative is captured within the symmetric policy enforcement context during the request message flow, the response message processing rule correlated with this particular alternative may be directly selected and executed without concern for evaluation of additional/other policies/alternatives because the symmetric policy enforcement context documents that these other policies/alternatives do not apply to the response message. For example, where an SLA policy three (e.g., "rulename-SLA3") is documented as applicable to the response message, then SLA policies two and one (e.g., "rulename-SLA2" and "rulename-SLA1") do not have to be evaluated to determine if they are applicable to the response message. Further, where alternative three of an SLA (e.g., "rulename-SLA3-3") is documented as applicable to the response message, then alternatives two and one (e.g., "rulename-SLA3-2" and "rulename-SLA3-1") also do not have to be evaluated to determine if they are applicable to the response message. It should additionally be noted that, where more than three alternatives exist for a particular policy, any alternatives of a higher number (e.g., "rulename-SLA3-4," "rulename-SLA3-5," etc.) also do not have to be evaluated to determine if they are applicable to the response message. As such, the present technology further reduces processing overhead by allowing the policy enforcement processing to skip evaluation of other policies and other policy alternatives that do not apply to the response message (because they did not apply to the correlated request message as documented within the symmetric policy enforcement context).

It should be noted that conception of the present subject matter resulted from recognition of certain limitations associated with policy enforcement in request/response message flows. For example, it was observed that policy enforcement runtimes do not enforce policies natively and that, instead, a policy is converted into device-specific native constructs for enforcement. It was further observed that this conversion may lead to a loss of policy context (e.g., a loss of correlation with the policy to be enforced for the request and response flow). It was also observed that the loss of policy context may further lead to a loss of policy coherency because an action taken on a request message uses a separate group of native constructs than an action taken on the associated response message. It was additionally observed that multiple consumer identities may result in the enforcement of multiple SLAs, but the consumer identity may be unavailable on a response flow, or the logic to determine and evaluate consumer identities may be prohibitively resource intensive for real-time message processing. It was further observed that the mechanism used to determine which alternative to enforce from a list of two or more policy alternatives may be unavailable on a response message flow (because of the response being a separate message and the loss of policy context), and that as a result an incorrect policy alternative may be used on the response message flow. In response to these several observations, it was determined that technology to ensure symmetric policy coherence during request and response flow message processing was needed. It was additionally determined that policy coherence technology for the enforcement of both SLD and SLA policies was appropriate so that the response flow policy enforcement path has coherency and symmetry with the initial request flow policy enforcement path. The present subject matter improves policy enforcement by providing for symmetric correlation of policy enforcement for request/response message pairs, as described above and in more detail below. As such, improved policy enforcement processing may be obtained through use of the present technology.

Several additional definitions may be utilized within the following description, and some are repeated and further defined below. The term "service policy" or "policy" as utilized herein represents any mediation enforcement provision, routing provision, security provision, or any other custom policy/provision that is written to a specification that a policy enforcement system may implement. As such, a service policy may be implemented as a web service (e.g., web services description language (WSDL)), as a representational state transfer (REST) implementation or service, as a web application (e.g., plain old XML (PDX)) implementation, as a database request, or otherwise as appropriate for the given implementation.

Regarding service policies, a service level agreement (SLA) is a service policy that represents an agreement (e.g., a contract for services) between a service provider and a consumer where a level of service is formally defined and agreed between the parties to the SLA. The SLA records a common understanding about services, priorities, responsibilities, guarantees, warranties, and any other particulars of the agreement. Examples of SLAs include business services such as a web service, a REST service, and a web application. The SLA may specify, for example, the levels of availability, serviceability, performance, operation, or other attributes of the service to be provided by the service provider to the consumer. As a further example, an SLA may represent a processing agreement such as a transaction rate, a processor utilization level, a disk utilization level, and a memory utilization level for the business service.

A service level definition (SLD) represents a service policy that protects the service provider infrastructure access and utilization constraints, such as for example from accesses by non-contracting entities for which an SLA has not been established, or to limit a maximum resource utilization to prevent service degradation (e.g., maximum number of messages per minute). An SLD, when attached to a policy subject, is enforced by a policy enforcement point (PEP). A "policy subject" represents an entity with which a policy (e.g., an SLA or SLD) may be associated, such as for example, with an endpoint of a transaction, a message, a resource, an operation, or other entity.

A policy administration point (PAP) represents a location (e.g., repository, registry, etc.) where policies such as SLAs and SLDs may be created, stored, accessed, and modified. A WebSphere® service registry and repository (WSRR) represents one possible example of a PAP. A policy enforcement point (PEP) represents an intermediary system that operates to enforce defined policies. The PEP provides proxy service offerings including policy enforcement. A "policy framework" represents the infrastructure used to convert supported policy vocabularies into processing actions and processing rules.

A policy may be specified as an SLA between a service provider and a consumer. Each consumer may have its own selected service options. As such, enforcement of an SLA by a PEP may involve identification of the respective consumers, correlation of the respective consumers with their selected service plans/levels, and monitoring of request rates (e.g., message rates, transaction rates, etc.) for each consumer based upon their respective selected plans.

Regarding processing rule implementations on a PEP, example transformations from policies to processing rules include transformation of a defined service policy into one or more processing actions in a normalized and interchangeable format. The normalized and interchangeable format may include, for example, a language such as extensible markup language (XML), Javascript® object notation (JSON), XML stylesheet language for transformations (XSLT), object-oriented languages such as Java™ and C++ programming languages, relational database management (RDBM) languages such as structured query language (SQL), and scripting languages/implementations such as PHP: Hypertext Preprocessor (PHP) and Perl.

It should be noted that the PEP processing technology described herein operates as a proxy for both the service providers and the consumers to enforce the various provisions of defined SLAs and SLDs. As such, the PEP represents a proxy component/entity for both the service provider(s) and for the consumer(s). Within this proxy context for policy enforcement, the PEP operates to protect the interests of the service providers to ensure that no unauthorized consumers access the respective services provided by the service providers and to ensure that consumers that are authorized do not exceed the defined SLDs associated with the services and service providers. Similarly, the PEP operates to protect the interests of consumers and service providers to ensure that the SLA(s) for which the consumers and service providers have contracted are upheld/enforced. To fulfill this dual-proxy role, the PEP operates as a proxy intermediary for both of the respective entities to analyze messages communicated between the respective entities and to enforce policy enforcement rules that are defined in association with the PEP based upon policies associated with the respective services and agreements.

A policy framework, as described in more detail below, consumes policies for enforcement by a PEP and evaluates policy enforcement activities configured based upon the particular resource (and potentially contents of the resources). To enforce the respective policies, the policy framework generates policy enforcement rules that include processing actions. It is these generated policy enforcement rules and processing actions that are implemented in real-time to enforce policies (SLAs and SLDs) during request and response message flow processing.

The symmetric coherent request/response policy enforcement described herein may be performed in real time to allow prompt determination of correlated policies to be enforced for a specific response message based upon the specific policies applied to the associated request message. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for symmetric coherent request/response policy enforcement. A computing device_1 102 through a computing device_N 104 represent consumer client devices that utilize services specified by SLAs. The computing device_1 102 through the computing device_N 104 may communicate with one another and with other devices via a network 106. A policy enforcement server_1 108 through a policy enforcement server_T 110 represent policy enforcement points (PEPs), as described above. The policy enforcement server_1 108 through the policy enforcement server_T 110 communicate and interconnect via a network 112 with a policy registry 114 that stores policies (e.g., SLDs and SLAs) generated by one or more of a service provider server_1 116 through a service provider server_M 118. It should be noted that the network 106 and the network 112 are illustrated as separate networks for ease of description, and that any arrangement of interconnection may be utilized as appropriate for a given implementation.

The service provider server_1 116 through the service provider server_M 118 represent service capable devices (e.g., messaging devices for text messages, etc.). The service provider server_1 116 through the service provider server_M 118 also represent administrative devices that may be utilized by service provider administrators for policy creation, such as creation of SLDs and SLAs.

Policies implemented by service provider administrators via devices, such as the service provider server_1 116 through the service provider server_M 118, may be stored within the policy registry 114 for enforcement by PEPs, such as the policy enforcement server_1 108 through the policy enforcement server_T 110. The policy enforcement server_1 108 through the policy enforcement server_T 110 each implement a policy framework as described in more detail below for transformation and enforcement of defined service policies stored in the policy registry 114 into policy enforcement rules that include processing rules and processing actions that are to be enforced during runtime against objects. The objects may be of varying granularity (e.g., at the level of specific consumers, organizations, service resources, etc., as described above) based upon the particular scope and configuration of the respective policies to be enforced for the respective service providers and consumers.

A PEP may be implemented via each of the policy enforcement server_1 108 through the policy enforcement server_T 110. The PEP has the role of enforcing policies defined outside or within the PEP. The PEPs operate as gateways that provide virtual services that proxy policy enforcement operations for the real backend services. The PEPs protect and optimize transactions flowing through the respective network(s) on behalf of the backend services. As such, the policy enforcement server_1 108 through the policy enforcement server_T 110 each represent proxy gateways that provide proxy services for the service providers represented by the service provider server_1 116 through the service provider server_M 118 and for consumers represented by the computing device_1 102 through the computing device_N 104.

It should be noted that there may be a many-to-one relationship of PEPs to service providers. Each PEP may create its own policy enforcement rules based upon policies to be enforced for a given service provider as appropriate for the respective PEP operating platform and technology. Each PEP may operate to perform the policy enforcement rule creation from defined policies such that policy enforcement is consistently applied across the set of PEPs that are designated to enforce the respective policies. Each respective PEP may further implement symmetric coherent request/response policy enforcement, as described herein, based upon the specific formatting and identification of the respective policy enforcement rules as created/implemented by the respective PEP platform to enforce the respective policies.

A policy monitoring point (PMP) 120 provides policy evaluation capabilities for analysis of runtime resource policy attachments and applied policy details within the system 100. The PMP 120 may evaluate transaction details from one or more PEPs implemented via the policy enforcement server_1 108 through the policy enforcement server_T 110. It should be noted that while the PMP 120 is illustrated as a separate component for ease of description purposes, it may be implemented via one of the policy enforcement server_1 108 through the policy enforcement server_T 110 or the service provider server_1 116 through the service provider server_M 118 without departure from the scope of the present technology.

As will be described in more detail below in association with FIG. 2 through FIG. 7, the policy enforcement server_1 108 through the policy enforcement server_T 110 may each provide automated symmetric coherent request/response policy enforcement. The automated symmetric coherent request/response policy enforcement is based upon creation of a symmetric policy enforcement context for a request/response message pair at the time of processing the request message. The symmetric policy enforcement context identifies exactly which native processing rules/actions were utilized to enforce policies on the request message, and also identifies which correlated processing rules are to be used to process the paired response message or any fault response message that results from the request message. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a service provider messaging server, a web server, application server, or other data server device, or any other device capable of processing information as described above and in more detail below.

The network 106 and the network 112 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
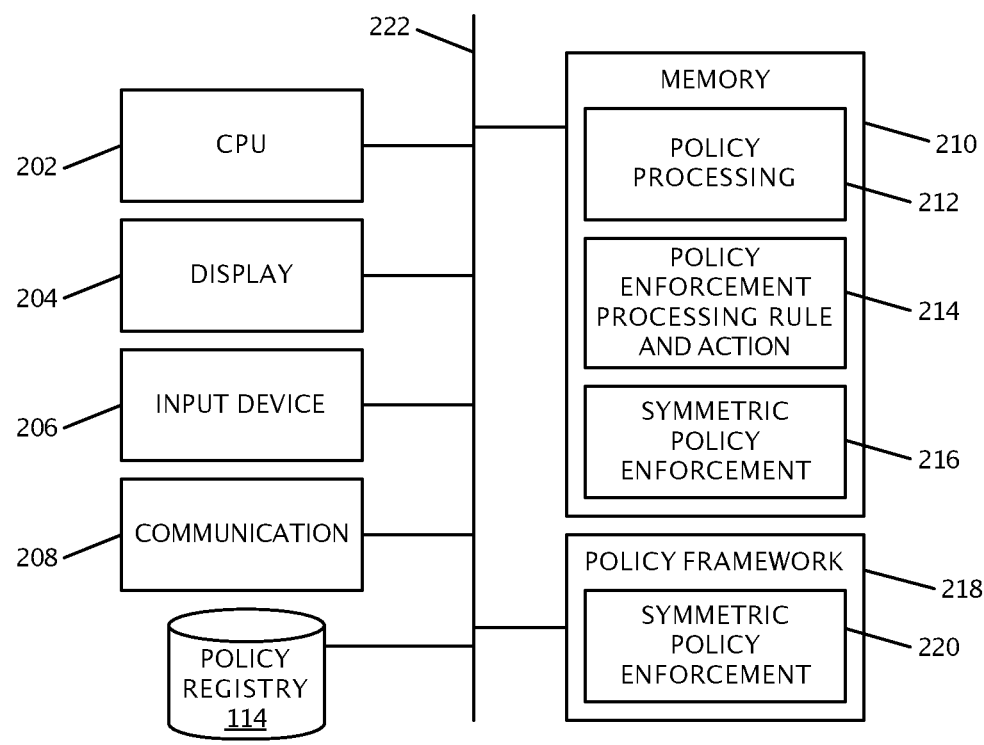
FIG. 2 is a block diagram of an example of an implementation of a core processing module capable of performing symmetric coherent request/response policy enforcement according to an embodiment of the present subject matter.

FIG. 2 is a block diagram of an example of an implementation of a core processing module 200 capable of performing symmetric coherent request/response policy enforcement. The core processing module 200 may be associated with the policy enforcement server_1 108 through the policy enforcement server_T 110 to implement symmetric coherent request/response policy enforcement. It should, however, be noted that components of the core processing module 200 may additionally or alternatively be associated with the computing device_1 102 through the computing device_N 104, with the policy monitoring point 120, or with the service provider server_1 116 through the service provider server_M 118, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of messaging and/or policy enforcement in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a policy processing storage area 212 that provides memory space for analysis of registry policies (e.g., SLAs and SLDs) in association with the core processing module 200 when implemented, for example, in association with one or more PEPs. The memory 210 also includes a policy enforcement processing rule and action storage area 214 that provides storage space for created policy enforcement rules and associated runtime processing actions. As described above, the created policy enforcement rules and associated runtime processing actions may be utilized for runtime enforcement of defined policies (e.g., SLAs and SLDs) in association with the core processing module 200 when implemented, for example, in association with one or more of the policy enforcement server_1 108 through the policy enforcement server_T 110.

The memory 210 additionally includes a symmetric policy enforcement storage area 216 that stores symmetric policy enforcement context information, including symmetric policy enforcement contexts for pairs of request/response messages. As described above, the symmetric policy enforcement contexts for each request/response message pair may be constructed during the request message flow processing, and may identify the particular native processing rules utilized by the specific PEP platform to enforce the appropriate policies on the request message. As also described above, the symmetric policy enforcement contexts for each request/response message pair are constructed at the time of request message processing to additionally store the appropriate native processing rules of the respective PEP platform to be utilized to process the correlated response message and/or a potential fault condition related to the request message.

As such, the symmetric and coherent (complementary) processing to be performed on the correlated response message may ensure that the appropriate polices are enforced across the request message and its correlated response message, where this symmetry would not otherwise be possible based upon prior technologies. Accordingly, the present technology may improve policy enforcement for request/response message pairs by consistently applying the appropriate and complementary policy enforcement processing with the respective proper ordering/sequencing to each of the request and response message (e.g., if request is decrypted, then encrypt response message, etc.).

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A policy framework module 218 is also illustrated. The policy framework module 218 provides policy translation into native processing rules and other functionality as appropriate for a given implementation. The policy framework module 218 may store native processing rules and policy mapping information within the policy enforcement processing rule and action storage area 214. As described above, each policy may be translated into three native processing rules to support the symmetric coherent request/response policy enforcement described herein. As such, each defined policy may be translated to an associated "request-rule," "response-rule," and "fault-rule," as appropriate for the particular PEP platform.

The policy framework module 218 includes a symmetric policy enforcement module 220 that provides processing capabilities for the core processing module 200, as described above and in more detail below. The symmetric policy enforcement module 220 implements the technology for symmetric coherent request/response policy enforcement of the core processing module 200, such as via one of the policy enforcement server_1 108 through the policy enforcement server_T 110. The symmetric policy enforcement module 220 may utilize the native processing rules stored within the policy enforcement processing rule and action storage area 214 to correlate complementary processing rule selection within individual request/response message pairs, as described above and in more detail below. The symmetric policy enforcement module 220 may create and store the symmetric policy enforcement context for each request/response message pair within the symmetric policy enforcement storage area 216. The symmetric policy enforcement module 220 may retrieve the appropriate/correlated symmetric policy enforcement context for a response message of a particular request/response message pair during the correlated response message flow. As such, the symmetric policy enforcement module 220 may expedite response (or fault) message processing using the previously identified and stored native processing rule identifiers specified for the response message (or fault) processing, to ensure that the appropriate and complementary policy is enforced for the response message. Accordingly, the symmetric policy enforcement module 220 symmetrically enforces policies across individual request/response message pairs at a native processing rule level within a PEP.

It should also be noted that the policy framework module 218 (and the associated symmetric policy framework module 220) may form a portion of other circuitry described without departure from the scope of the present subject matter. Further, the policy framework module 218 may alternatively be implemented as an application stored within the memory 210. In such an implementation, the policy framework module 218 may include instructions executed by the CPU 202 for performing the functionality described herein. The CPU 202 may execute these instructions to provide the processing capabilities described above and in more detail below for the core processing module 200. The policy framework module 218 may form a portion of an interrupt service routine (ISR), a portion of an operating system, a portion of a browser application, or a portion of a separate application without departure from the scope of the present subject matter.

The policy registry 114 is also shown associated with the core processing module 200 within FIG. 2 to show that the policy registry 114 may be coupled to the core processing module 200 without use of external connectivity, as appropriate for a given implementation.

The CPU 202, the display 204, the input device 206, the communication module 208, the memory 210, the policy framework module 218, and the policy registry 114 are interconnected via an interconnection 222. The interconnection 222 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the policy registry 114 is illustrated as a separate component for purposes of example, the information stored within the policy registry 114 may also/alternatively be stored within the memory 210 without departure from the scope of the present subject matter. Accordingly, the core processing module 200 may take many forms and may be associated with many platforms.

To provide more detail regarding policy alternatives, the following pseudo syntax example is provided to illustrate one situation where a policy alternative may be implemented. For purposes of the present example, it is assumed that a service provider (vendor) has upgraded a messaging service related to extensible markup language (XML) transactional messages from version one (V1) to version two (V2) of that service. It is further assumed that at least two customers want to send and receive messages formatted in the different versions and, as such, the vendor wants to accept messages formatted in either version one (V1) or version two (V2) format from the respective customers rather than requiring the customer that still uses the version one formatting of messages to upgrade to version two. It should be noted that a fault message processing rule is not illustrated within the present example, but that such processing may be added as appropriate for a given implementation.

Within the following pseudo syntax example, the phrase "ExactlyOne" instructs the respective PEP to enforce one of the policies in the grouping. The following pseudo syntax example includes two distinct portions (delineated by "All" tag pairs—e.g., <wsp:All> and </wsp:All>). The first portion processes messages that arrive formatted in the version two (V2) format and allows these messages to pass to the backend system unmodified. The second portion processes messages that arrive formatted in the version one (V1) format and converts these messages to version two (V2) for backend processing (e.g., the processing format supported as upgraded by the service provider), and then processes the response message to convert the response back to version one (V1) for the respective customer(s).

For purposes of the present description, the different processing branches for the first and second portions of the pseudo syntax example represent policy alternatives that may be managed as described above and in more detail further below. The pseudo syntax example follows:

the respective policies and policy alternatives. As such, any and all such possibilities are considered within the scope of the present technology.

As described above, as policies and policy alternatives are processed along a request message flow path, a policy that is enforced is documented and stored within a symmetric policy enforcement context. It should be noted that construction and storage of a symmetric policy enforcement context structure may be performed in any manner appropriate for the given implementation, and all such implementation possibilities are considered within the scope of the present technology.

Figure 3:
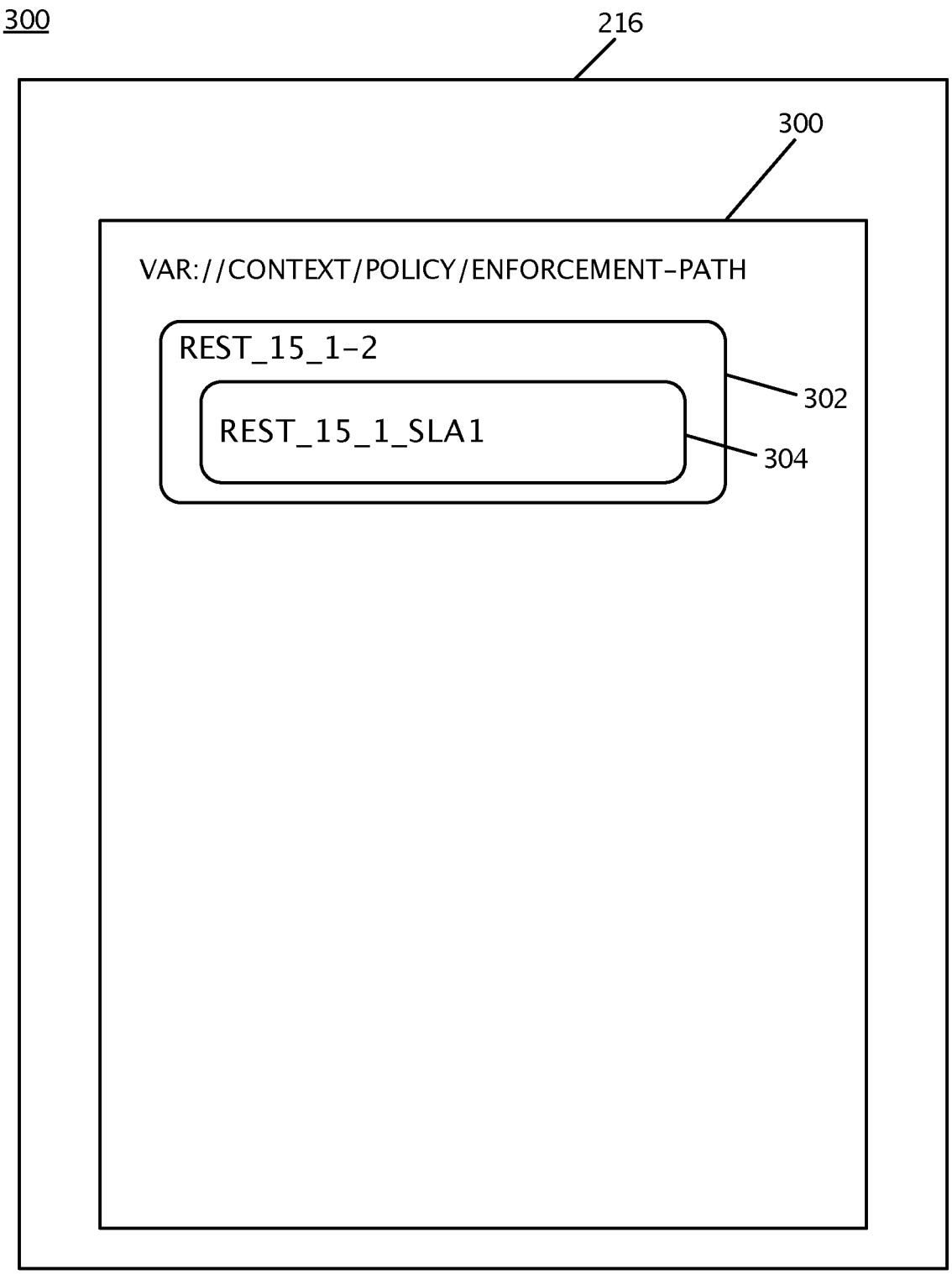
FIG. 3 is a diagram of an example of an implementation of a symmetric policy enforcement context in a first state that documents initial policy enforcement processing performed on a request message according to an embodiment of the present subject matter.
Figure 4:
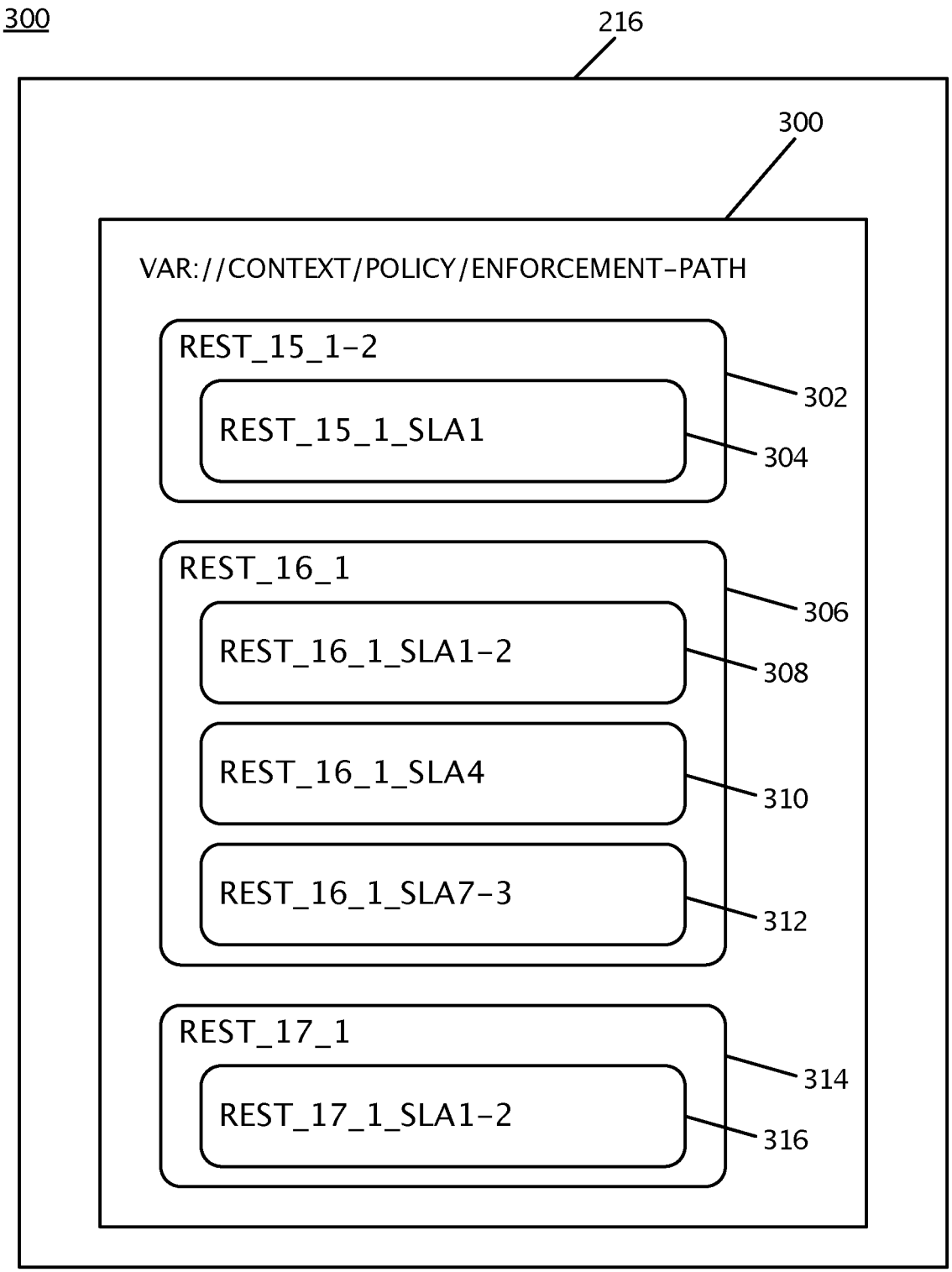
FIG. 4 is a diagram of an example of an implementation of the symmetric policy enforcement context of FIG. 3 in a final state that documents completed policy enforcement processing performed on the request message according to an embodiment of the present subject matter.

FIG. 3 through FIG. 4 described below represent an example of a graphical illustration of construction (e.g., building up or spooling) of a symmetric policy enforcement context 300 for a request/response message pair to provide a foundation for the flow charts that follow as described further below. The symmetric policy enforcement context 300 is shown stored within the symmetric policy enforcement storage area 216 of the memory 210. For purposes of the present example, a representational state transfer (REST) service is assumed to be implemented and a policy associated with this REST service is the policy that is enforced. As described above, many other variations on services, and many other variations on formatting and storage of a symmetric policy enforcement context, are possible and all are considered within the scope of the present subject matter. Additionally, for purposes of the present example, SLDs and SLAs may each include one implementation or may include one or more alternatives. Alternatives are illustrated and

```
<wsp:ExactlyOne>
    <wsp:All>
        <wsmp:Rule>
            <wsmp:Action>
                <wsmp:ValidateMessage>       <!-Allow V2 messages to pass -->
                    <wsmp:XSD>local:///validate-req-V2.xsd</wsmp:XSD>
                </wsmp:ValidateMessage>
            </wsmp:Action>
        </wsmp:Rule>
    </wsp:All>
    <wsp:All>
        <wsmp:Rule>
            <wsmp:Action>
                <wsmp:ValidateMessage>
                    <wsmp:XSD>local:///validate-req-V1.xsd</wsmp:XSD>
                </wsmp:ValidateMessage>
                <wsmp:ExecuteXSL>           <!-- Convert request from V1 to V2 -->
                    <wsmp:Stylesheet>http://convert-req-V1-to-V2.xsl</wsmp:Stylesheet>
                </wsmp:ExecuteXSL>
                <wsmp:ValidateMessage>
                    <wsmp:XSD>local:///validate-req-V2.xsd</wsmp:XSD>
                </wsmp:ValidateMessage>
            </wsmp:Action>
            <ResponseAction>
                <wsmp:ExecuteXSL>           <!-- Convert response back to V1 -->
                    <wsmp:Stylesheet>http://convert-resp-V2-to-V1.xsl</wsmp:Stylesheet>
                </wsmp:ExecuteXSL>
            </ResponseAction>
        </wsmp:Rule>
    </wsp:All>
</wsp:ExactlyOne>
```

As can be seen from the above pseudo syntax example, policy alternatives may be implemented to manage different branches of processing that may apply based upon system, version, or other differences between different platforms. It should be noted that many other possibilities exist for implementation of policy alternatives, such as for example combining multiple policies, each with multiple alternatives, into a normalized policy that implements all permutations of described using a hyphen followed by a numeral (e.g., "-2" represents a second alternative associated with the respective policy).

FIG. 3 is a diagram of an example of an implementation of a symmetric policy enforcement context 300 in a first state that documents initial policy enforcement processing performed on a request message. As can be seen from FIG. 3, a first service level definition (SLD) policy 302 is shown to include a single service level agreement (SLA) policy 304 that has been enforced. The SLD policy 302 is named "REST_15_1-2," while the SLA policy 304 is named "REST_15_1_SLA1."

Based upon the description above regarding the shared syntactic choices for tracking execution of policies and capturing the three pieces of information usable to directly select platform-specific policy enforcement processing rules to process the correlated response message, the first piece of information captured within the present example is the shared prefix "REST_15_1." As also described above, this shared prefix is shared among both the SLD policy 302 and the SLA policy 304 within the present example. This shared prefix not only identifies the SLD policy 302, but use of the shared prefix to also name the SLA policy 304 identifies the association between the SLD policy 302 and the SLA policy 304.

With respect to capturing the indication of whether the rule is enforcing an SLA or an SLD (the second piece of information), it can be seen that for this particular example, the SLA policy 304 includes the post-fix "SLA1," which indicates that it is an SLA processing rule. As such, for purposes of this particular example, the SLD policy 302 may be inferred to be an SLD policy by absence of any post-fix. However, it should be noted that a hyphenated post-fix of "-SLD" or other form of differentiation between SLDs and SLAs may be used as appropriate for a given implementation.

With respect to capturing an indication of whether the processing rule is an alternative (the third piece of information), it can be seen that the SLD policy 302 "REST_15_1-2" includes a hyphenated post-fix "-2." This form of post-fix indicates that the respective alternative two (2) of the available alternatives for this particular SLD policy has been used to process the request message.

As such, it can be seen from FIG. 3 and the description above that, at this initial state of processing of the respective request message, the symmetric policy enforcement context 300 includes information that may be utilized during response message processing to directly identify the respective response (or fault) message processing rule named using the same syntactic information as the captured request message processing rules. For example, if a processing rule named "REST_15_1-2 req" has been executed to enforce policies on the request message (and the related information was captured within the respective symmetric policy enforcement context 300), then the correlated "REST_15_1-2_process_resp" or the correlated "REST_15_1-2_process_fault" platform-specific policy enforcement processing rule may be directly selected and executed to enforce the same policy on the correlated response message of the correlated request/response message pair. As such, the present technology circumvents any additional processing that would otherwise be required to perform additional evaluation of the response message and to additionally make determinations based upon the response message regarding which policies to apply to the response message. As such, the present technology improves response message processing. All applicable policies are already documented within the symmetric policy enforcement context 300.

FIG. 4 is a diagram of an example of an implementation of the symmetric policy enforcement context 300 of FIG. 3 in a final state that documents completed policy enforcement processing performed on the request message. As can be seen from FIG. 4, identifiers of several additional SLDs and SLAs have been stored within the symmetric policy enforcement context 300. Reference is made the FIG. 4 for ease of description purposes. It is noted that the description of FIG. 3 above applies to the nomenclature and shared syntactic choices for processing rule naming as illustrated within FIG. 4. As such, an SLD policy 306 is shown to have been processed and to include an SLA policy 308, an SLA policy 310, and an SLA policy 312. Similarly, an SLD policy 314 is shown to have been processed and to include an SLA policy 316.

As noted above, it can be seen from FIG. 4 that all processing rule identifiers stored within the SLD policy 306 share the same rule prefix (e.g., "REST_16_1"). Similarly, the SLD policy 314 and the SLA policy 316 each share the same rule prefix (e.g., "REST_17_1"). Further, the SLD policy 306 and the SLD policy 314 are documented/identified as SLDs by absence of a post-fix, while the SLA policies 308, 310, 312, and 316 are documented to be SLAs with the hyphenated post-fix "-SLA" and an integer numeral that identifies which SLA was processed against the request message. For example, within "REST_16_1_SLA4," the integer four (4) indicates that the fourth SLA associated with the particular SLD was processed. It can further be seen that alternatives are identified by use of a hyphenated post-fix (e.g., "-2," "-3," etc.). Absence of a post-fix is used in the present example to indicate that the processing rule that was executed does not have an alternative.

As such, FIG. 3 and FIG. 4 provide one example of building up (e.g., spooling) processing rule information executed in association with processing of a request rule, as stored within the symmetric policy enforcement context 300. As described above and in more detail below, the processing rule information stored within the symmetric policy enforcement context 300 may be unwound (e.g., un-spooled) during processing of the response (or fault) message to directly identify the appropriate request or fault message processing rule to select.

It should be noted that for purposes of the present example and description, for request message processing, while the respective SLDs may be identified prior to identification of the SLAs that are associated with the particular SLDs, the SLAs are processed before the respective SLD (e.g., SLA policy 304 "REST_15_1_SLA1" is processed before SLD policy 302 "REST_15_1-2"). In contrast, for response message processing, the SLDs are enforced before the respective associated SLAs that fall under the respective SLD (e.g., SLD policy 302 "REST_15_1-2" is processed before SLA policy 304 "REST_15_1_SLA1"). As an alternative implementation/embodiment, this ordering may be changed as appropriate for a given implementation.

Additionally, for purposes of the present example and description, the unwinding of a symmetric policy enforcement context to process the response message may be performed in the reverse order of the processing captured during the request message flow (e.g., process the response message beginning at the bottom of the illustrated symmetric policy enforcement context 300 and move upward through the additional policies). As such, for the request message flow the SLD policy 302 is processed before the SLD policy 306, which is processed before the SLD policy 314. In contrast, for the response message flow, the SLD policy 314 is processed before the SLD policy 306, which is processed before the SLD policy 302. Accordingly, for purposes of additional example, if a request message is processed to first validate a digital signature and the message is then decrypted, the response message may first be encrypted and then digitally signed. This form of symmetric processing ensures that correlated request/response message pairs are processed coherently and that response messages are returned to the requesting processing platform in a coherently and symmetrically processed manner.

As described above, as an alternative to the above example implementation/embodiment, it should be noted that no particular order is required for unwinding a symmetric policy enforcement context. Further, no particular order is required with respect to ordering of processing of the SLDs relative to the associated SLAs. Any permutation of the respective processing ordering possibilities may be used as appropriate for the given implementation. Accordingly, for purposes of the present description, any "prescribed order" of processing the respective policies and/or policy enforcement processing rules/actions that is appropriate for a given implementation may be used.

It should further be noted that, as described above, the present technology further reduces processing overhead by allowing the policy enforcement processing to skip evaluation of other policies and other policy alternatives that do not apply to the response message (because they did not apply to the correlated request message as documented within the symmetric policy enforcement context). For example, with reference to FIG. 4 as described above, where the SLA policy 312 "REST_16_1_SLA7-3" is followed by SLA policy 310 "REST_16_1_SLA4" (again, processed in reverse order within the present example), then other alternatives of SLAT do not have to be evaluated during policy enforcement of the response message. Specifically, within the present example, alternatives two and one (e.g., REST_16_1 SLA7-2 and REST_16_1 SLA7-1) would not have to be considered because alternative three applies to the request/response message pair. Further, an SLA6 and an SLA5 and any respective alternatives would not have to be evaluated or considered because the symmetric policy enforcement context 300 documents that the SLA4 policy (SLA policy 310 "REST_16_1_SLA4") follows enforcement of the SLAT alternative three (SLA policy 312 "REST_16_1_SLA7-3") for the response message policy enforcement (again, reverse order of processing). As such, the correct policy and policy alternatives may be directly selected in an efficient manner without additional processing to determine which policies/alternatives apply to the response message. Accordingly, the present technology further reduces processing overhead by allowing the policy enforcement processing to skip evaluation of other policies and other policy alternatives that do not apply to the response message (because they did not apply to the correlated request message as documented within the symmetric policy enforcement context).

Figure 5:
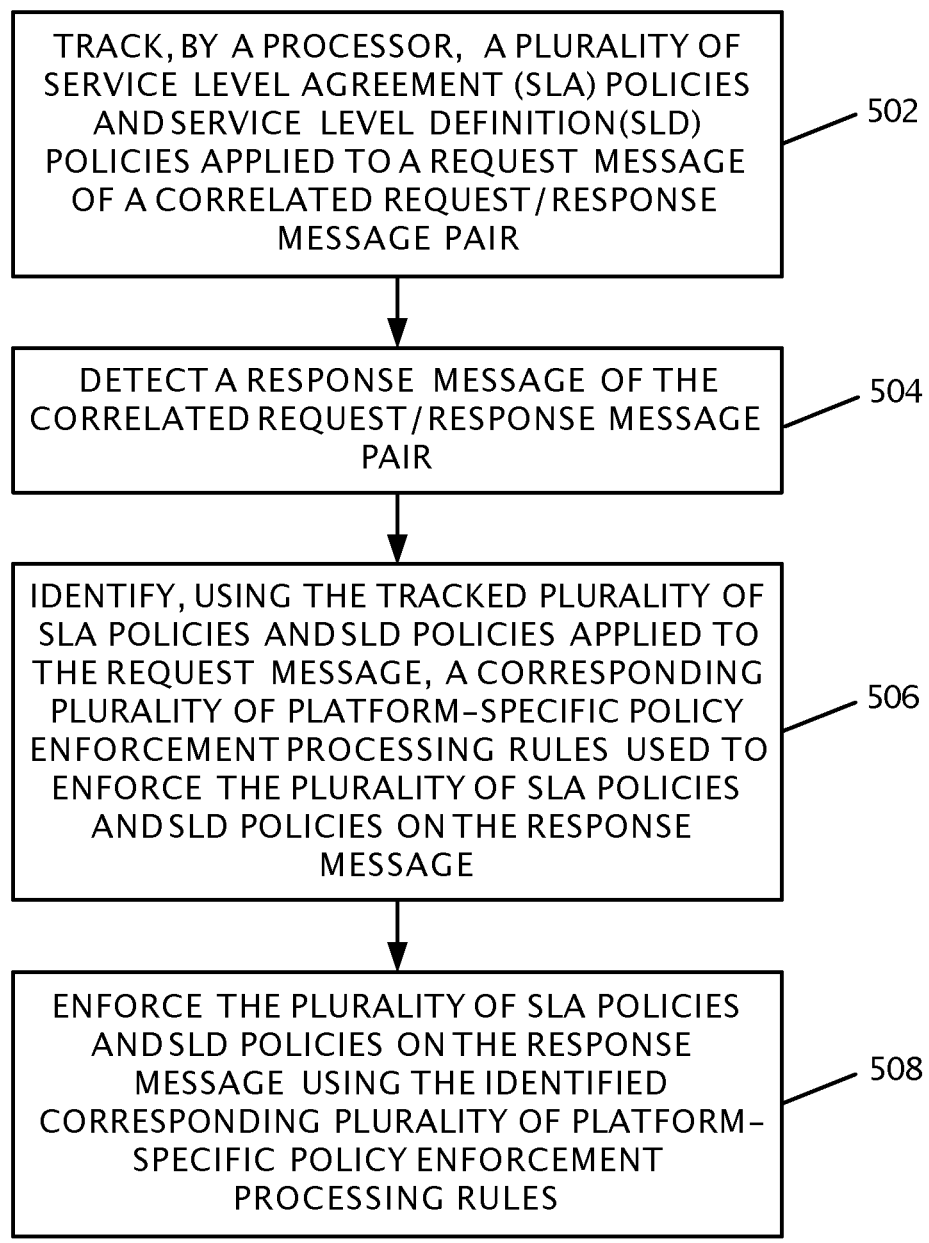
FIG. 5 is a flow chart of an example of an implementation of a process for symmetric coherent request/response policy enforcement according to an embodiment of the present subject matter.
Figure 6:
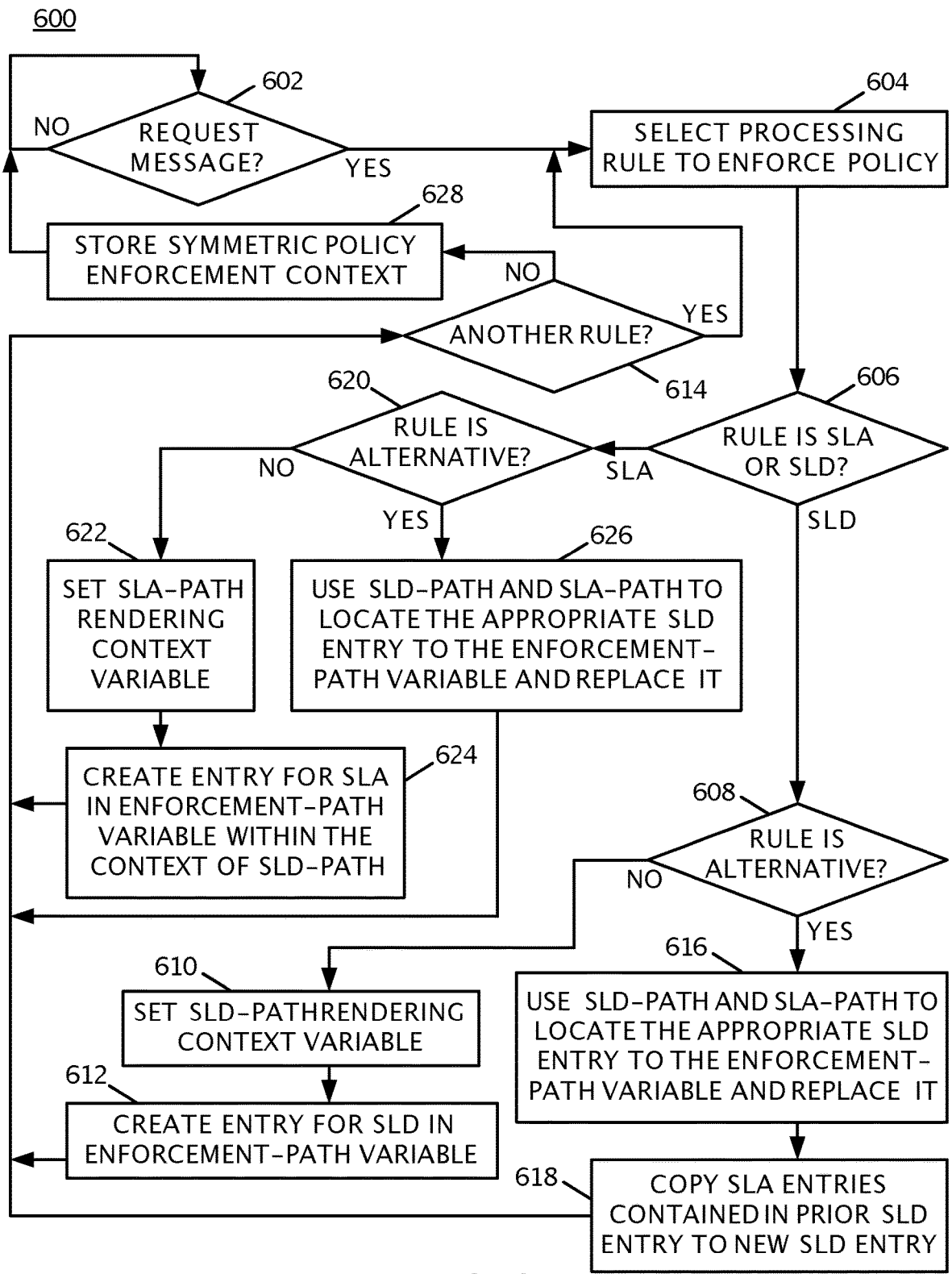
FIG. 6 is a flow chart of an example of an implementation of a process for construction and storage of a symmetric policy enforcement context structure usable for symmetric coherent request/response policy enforcement according to an embodiment of the present subject matter.
Figure 7:
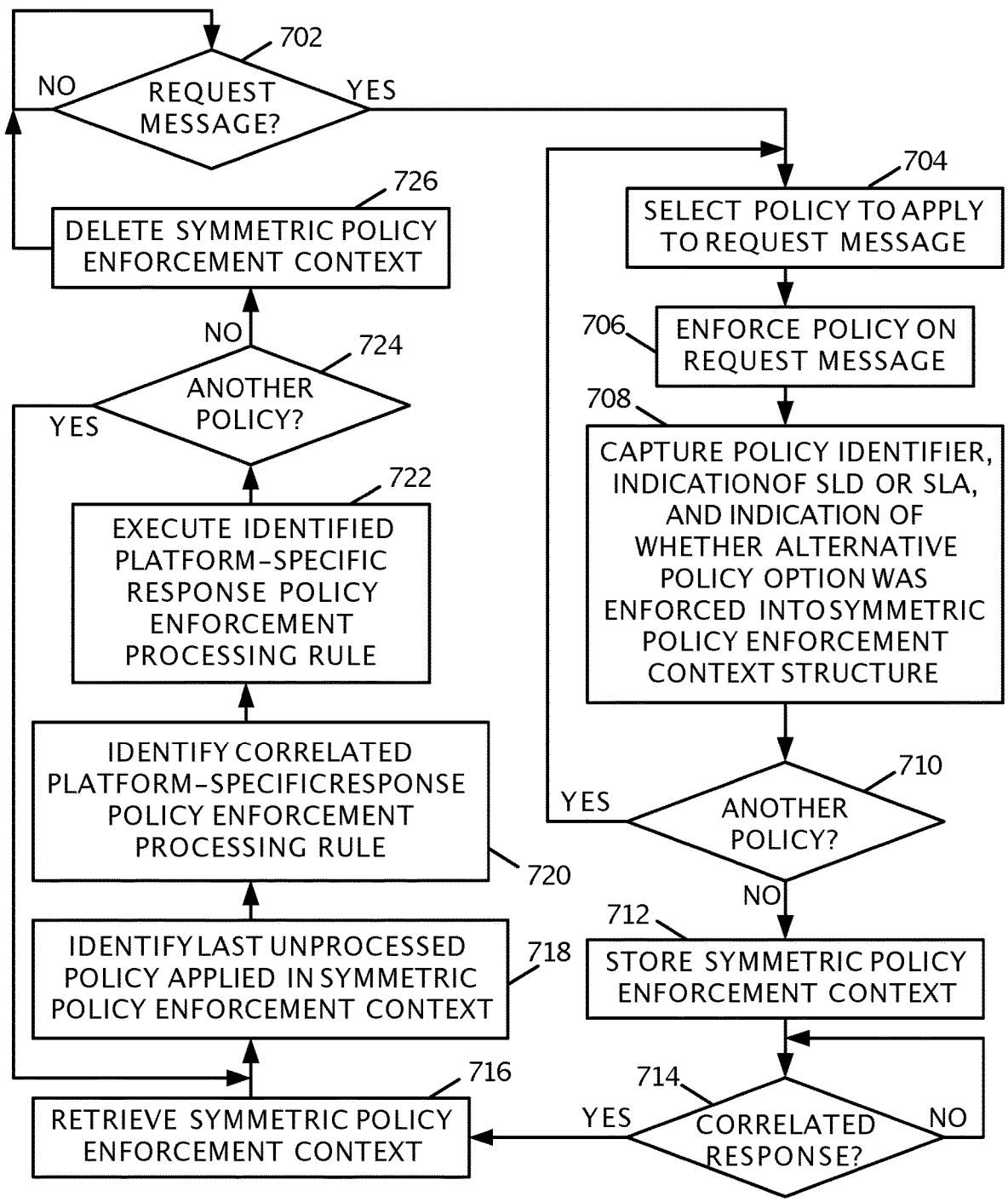
FIG. 7 is a flow chart of an example of an implementation of a process for processing request messages to capture a symmetric policy enforcement context structure and processing response messages using the captured symmetric policy enforcement context structure to perform symmetric coherent request/response policy enforcement according to an embodiment of the present subject matter.

FIG. 5 through FIG. 7 described below represent example processes that may be executed by devices, such as the core processing module 200, to perform the automated symmetric coherent request/response policy enforcement associated with the present subject matter. Many other variations on the example processes are possible and all are considered within the scope of the present subject matter. The example processes may be performed by modules, such as the symmetric policy enforcement module 220 of the policy framework module 218 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 5 is a flow chart of an example of an implementation of a process 500 for symmetric coherent request/response policy enforcement. At block 502, the process 500 tracks, by a processor, a plurality of service level agreement (SLA) policies and service level definition (SLD) policies applied to a request message of a correlated request/response message pair. At block 504, the process 500 detects a response message of the correlated request/response message pair. At block 506, the process 500 identifies, using the tracked plurality of SLA policies and SLD policies applied to the request message, a corresponding plurality of platform-specific policy enforcement processing rules used to enforce the plurality of SLA policies and SLD policies on the response message. At block 508, the process 500 enforces the plurality of SLA policies and SLD policies on the response message using the identified corresponding plurality of platform-specific policy enforcement processing rules.

FIG. 6 is a flow chart of an example of an implementation of a process 600 for construction and storage of a symmetric policy enforcement context structure usable for symmetric coherent request/response policy enforcement. As described above, for purposes of the present example request message processing, SLAs are processed before the respective SLDs. However, any other order of processing appropriate for a given implementation may be performed. Additionally, the process 600 as entered and described is considered to also describe complementary/symmetric processing for unwinding a symmetric policy enforcement context to process a response or fault message. As such, this additional processing is considered incorporated into the description and illustration of FIG. 6.

At decision point 602, the process 600 makes a determination as to whether a request message for which a policy is to be enforced has been detected, such as in response to arrival at a PEP. In response to determining that a request message for which a policy is to be enforced has been detected, the process 600 selects a processing rule to enforce the appropriate policy on the request message at block 604. It should be noted that the process 600 is iterative with respect to enforcing policies using multiple processing rules, and that a first processing rule is selected during the first iteration. At decision point 606, the process 600 makes a determination as to whether the selected processing rule is an SLA processing rule or an SLD processing rule. Again, as described above, the description herein processes any SLA processing rules associated with a particular SLD prior to processing the respective SLD processing rule. However, it should also be noted that SLAs are processed within the policy context of any SLDs. As such, SLAs may be considered to be associated with SLDs. Processing associated with a determination that the selected processing rule is an SLA processing rule is deferred and described in more detail below.

In response to determining that the selected processing rule is an SLD processing rule, the process 600 makes a determination at decision point 608 as to whether the rule is an alternative processing rule. Processing associated with an affirmative determination at decision point 608 is deferred and described in more detail below.

In response to determining that the rule is not an alternative processing rule, the process 600 sets an SLD-PATH rendering context variable at block 610. The SLD-PATH rendering context variable represents an index into an enforcement path that is built up as a policy is enforced (e.g., using an enforcement-path variable). The process 600 creates an entry for the SLD in the enforcement-path variable at block 612.

As described above, while other implementations are considered within the scope of the present description, for purposes of the present example, SLAs are enforced within the context of SLDs, and as such the SLD-PATH rendering context variable may be set, and the SLD portion of the enforcement path may be created (e.g., "REST_15_1" of FIG. 3). If an SLA policy is to be enforced, the SLA-PATH rendering context variable may be set and the SLA portion of the enforcement path may be created (e.g., "REST_15_1_SLA1" in FIG. 3). As such, as a policy alternative is enforced for the SLD, the SLD-PATH rendering context variable may be used to lookup the SLD and may be replaced with "REST_15_1-2." Similarly, SLA alternatives may be tracked in the enforcement path using SLD-PATH and SLA-PATH rendering context variables.

The process 600 proceeds to decision point 614 to make a determination as to whether another processing rule is available/designated to enforce policies on the received request message. Processing associated with a negative determination at decision point 614 is deferred and described in more detail below. In response to determining that another processing rule is available/designated to enforce policies on the received request message, the process 600 returns to block 604 and selects the next processing rule to be enforced on the request message. The process 600 continues processing as described above.

Returning to the description of decision point 608, in response to determining that the rule is an alternative processing rule, the process 600 uses the SLD-PATH and SLA-PATH environment variables to locate the appropriate SLD entry to the enforcement-path variable and replaces the enforcement-path variable value with the located SLD entry at block 616. The process 600 copies SLA entries contained in the prior SLD entry to a new SLD entry at block 618. The purpose of copying the SLA entries is to maintain the SLA entries so that the respective entries are known at the time of processing of the correlated response. For example, where an extensible markup language (XML) node set and an XML stylesheet language for transformations (XSLT) are used, the process 600 may implement the copying by creating a new element node and copying nodes from the old element. Alternatively, where a data structure is used, the respective location at which to change the respective SLA base rule name value may be defined within the data structure, and may be directly updated with the SLA information. As such, any manner of maintaining SLA entries may be implemented as appropriate for a given implementation.

The process 600 proceeds to decision point 614 to determine whether another processing rule is available/designated to enforce policies on the received request message. Where another processing rule is available/designated to enforce policies on the received request message, the process 600 selects the next processing rule to be enforced on the request message at block 604, and iterates as described above.

Returning to the description of decision point 606, in response to determining that the selected processing rule is an SLA processing rule, the process 600 makes a determination at decision point 620 as to whether the rule is an alternative processing rule. Processing associated with an affirmative determination at decision point 620 is deferred and described in more detail below.

In response to determining that the rule is not an alternative processing rule, the process 600 sets an SLA-PATH rendering context variable at block 622. The SLA-PATH rendering context variable represents an index into an enforcement path that is built up as a policy is enforced, as described in more detail above. The process 600 creates an entry for the SLA in an enforcement-path variable within a context of an SLD-PATH environment variable at block 624.

The process 600 transitions and makes a determination at decision point 614 as to whether another processing rule is available/designated to enforce policies on the received request message. In response to determining that another processing rule is available/designated to enforce policies on the received request message, the process 600 returns to block 604 and selects the next processing rule to be enforced on the request message. The process 600 continues processing as described above.

Returning to the description of decision point 620, in response to determining that the rule is an alternative processing rule, the process 600 uses the SLD-PATH and SLA-PATH environment variables to locate the appropriate SLD entry to the enforcement-path variable and replaces the enforcement-path variable value with the located SLD entry at block 626. The SLD-PATH and SLA-PATH environment variables represent indexes into the enforcement path.

The process 600 proceeds to decision point 614 to determine whether another processing rule is available/designated to enforce policies on the received request message. Where another processing rule is available/designated to enforce policies on the received request message, the process 600 again selects the next processing rule to be enforced on the request message at block 604, and iterates as described above.

Returning to the description of decision point 614, in response to determining that another processing rule is not available/designated to enforce policies on the received request message (all processing rules have been executed), the process 600 stores the symmetric policy enforcement context constructed during the iterative execution of the processing rules at block 628. The symmetric policy enforcement context may then be used to symmetrically and coherently process the associated response (or fault) message of the request/response message pair. The process 600 returns to decision point 602 and iterates as described above.

As such, during the processing executed for policy enforcement of a request message, the process 600 builds context usable to process a correlated response message. This context represents specific rule processing details that are to be symmetrically and coherently applied to the correlated response message. It should be noted that for implementations that create the respective environment variables described above for each request/response message pair (e.g., one set of variables for each transaction), the storing of the symmetric policy enforcement context structure may be considered to be performed when the respective variables are updated, as described above.

FIG. 7 is a flow chart of an example of an implementation of a process 700 for processing request messages to capture a symmetric policy enforcement context structure and processing response messages using the captured symmetric policy enforcement context structure to perform symmetric coherent request/response policy enforcement. It should be understood that the process 700 represents processing for one correlated request/response message pair. However, it should also be noted that the process 700 may be implemented to process multiple correlated request/response message pairs, either as separate processing or within a single process, and the process 700 may further be implemented as a multi-threaded process, each as appropriate for a given implementation.

At decision point 702, the process 700 makes a determination as to whether a request message has been detected. As described above, the request message may result in a response message, and as such the request message forms a first message of a correlated request/response message pair, and a resulting response message forms a correlated response message of the correlated request/response message pair. In response to determining that a request message has been detected, the process 700 begins request message policy enforcement flow processing.

At block 704, the process 700 selects a policy to apply to the request message. The policy may be selected in any manner appropriate for the given implementation, such as by inspection of the message or other form of processing as appropriate for a given implementation. For example, for an SLD, the processing may be considered "resource oriented." As such, the process 700 may determine whether a requested resource matches some pre-defined criteria (e.g., a name of a service, a URL, etc.). In contrast, for an SLA, the processing may be considered "consumer oriented" (where the consumer may be a user, or an application on another system). As such, the process 700 processes an agreement between the respective consumer and the owner of the resource and selects a policy using a manifestation of the consumer identifier (e.g., from a message header, as embedded in a message, as part of an action that authenticates consumer, a custom extraction method, etc.).

At block 706, the process 700 enforces the selected policy on the request message. Enforcement of the selected policy on the request message may involve identification or determination of a platform-specific request message policy enforcement processing rule of a three rule set (e.g., request rule, response rule, and fault processing rule) that is configured to enforce the selected policy, and execution of the respective platform-specific request message policy enforcement processing rule.

At block 708, the process 700 captures a policy identifier of the selected policy, captures an indication that distinguishes an enforced SLD policy from an enforced SLA policy, and captures an indication of whether a policy alternative was executed to enforce the respective policy (e.g., an identifier of each executed policy alternative) into a symmetric policy enforcement context structure. These items of information may be captured from a name of the executed policy enforcement rule, such as from a platform-specific policy enforcement rule name prefix, SLA or SLD identifier, and an alternative identifier (e.g., "-2") of the respective processing rule. These items of information may further be shared within names of the set of policy enforcement rules that implement an SLD policy, any associated SLA policies, and any policy alternatives available for the SLD policy and any associated SLA policies.

At decision point 710, the process 700 makes a determination as to whether another policy is to be enforced on the request message. In response to determining that another policy is to be enforced on the request message, the process 700 returns to block 704 and iterates as described above. As such, the process 700 captures, within a symmetric policy enforcement context structure, an execution sequence of a plurality of platform-specific policy enforcement processing rules used to enforce the plurality of SLA policies and SLD policies applied to the request message, and any policy alternatives of the plurality of SLA policies and SLD policies. As also described above, SLA policies associated with an SLD policy may be enforced on the request message prior to the associated SLD policy. Further, the associated SLD policy may be enforced on the response message prior to enforcing the associated SLA policies on the response message in a reverse sequence using the identified corresponding plurality of platform-specific policy enforcement processing rules.

In response to determining that there is not another policy to be enforced on the request message, the process 700 stores the symmetric policy enforcement context structure at block 712. Storage of the symmetric policy enforcement context structure may include storing the structure within a memory, adding the structure to (e.g., overloaded within) an existing transactional message context created to manage the respective request/response message pair throughout the transaction, or other form of storage as appropriate for the given implementation. The existing transactional message context may include a transactional context structure constructed for the correlated request/response message pair, and may include a transaction identifier assigned to the correlated request/response message pair. Alternatively, a transaction identifier may be assigned to the symmetric policy enforcement context structure. As described above, the transaction identifier may be used to correlate the created symmetric policy enforcement context structure, and as such the request message policy processing, with the appropriate/correlated response message.

At decision point 714, the process 700 makes a determination as to whether a response message that is correlated with the processed request message has been detected. As described above, this determination may be made based upon a detection of a transaction identifier of the correlated request/response message pair. Detection of the transaction identifier may be performed using a transaction identifier of the symmetric policy enforcement context structure or a transactional context structure, using a message identifier, or otherwise as appropriate for a given implementation. In response to determining that a response message that is correlated with the processed request message has been detected, the process 700 retrieves the correlated symmetric policy enforcement context structure at block 716.

At block 718, the process 700 identifies a last policy applied to the previous request message in the symmetric policy enforcement context structure. At block 720, the process 700 identifies a correlated platform-specific response policy enforcement processing rule to use to enforce the identified policy on the response message.

As described above, the example processing of the process 700 executes a sequence of a corresponding plurality of platform-specific policy enforcement processing rules used to enforce the plurality of SLA policies and the SLD policies, and any policy alternatives of the plurality of SLA policies and SLD policies, on the response message. For purposes of the present example, the "prescribed order" of processing is an executed sequence that is performed in a reverse order relative to the captured execution sequence of the request message processing rules to symmetrically and coherently enforce the plurality of SLA policies and SLD policies that were applied to the request message on the response message. Further, as described above, the associated SLD policy may be enforced on the response message prior to enforcing the associated SLA policies on the response message in the reverse sequence using the identified corresponding plurality of platform-specific policy enforcement processing rules. However, as also described above, any prescribed order of processing may be implemented as appropriate for the given implementation.

At block 722, the process 700 executes the identified correlated platform-specific response policy enforcement processing rule to enforce the identified policy on the response message. At decision point 724, the process 700 makes a determination as to whether another policy is identified within the symmetric policy enforcement context structure that is to be enforced on the response message. In response to determining that another policy is identified within the symmetric policy enforcement context structure that is to be enforced on the response message, the process 700 returns to block 718 and identifies the next policy (last unprocessed) from the end of the list (e.g., again, in reverse order) to enforce on the response message and iterates as described above.

In response to determining at decision point 724 that there is not another policy identified within the symmetric policy enforcement context structure that is to be enforced on the response message, the process 700 deletes the stored symmetric policy enforcement context structure that was built to coherently enforce policies on the correlated request/response message pair at block 726. The process 700 returns to decision point 702 and iterates as described above.

As such, the process 700 tracks request message policy enforcement flow processing including tracking SLA policies, SLD policies, and policy alternatives that are applied to the request message, and the order of processing to enforce policy on the request message. The process 700 builds/constructs a symmetric (coherent) policy enforcement context structure during the request message policy enforcement flow. The process 700 then uses the constructed symmetric policy enforcement context structure to directly identify the appropriate policies (SLA and SLD) and policy alternatives to apply to the correlated response message and the appropriate processing order of the respective policies/alternatives. From the identification and ordering of the appropriate policies and policy alternatives, the process 700 selects the correlated policy enforcement processing rules and executes the selected policy enforcement processing rules in the appropriate processing order of execution on the correlated response message. For purposes of the present example, the selected policy enforcement processing rules are executed in a reverse order relative to execution of correlated policy enforcement processing rules that were applied to enforce policies on the request message. Other execution sequences are possible and all such sequence options are considered within the scope of the present subject matter.

As described above in association with FIG. 1 through FIG. 7, the example systems and processes provide symmetric coherent request/response policy enforcement. Many other variations and additional activities associated with symmetric coherent request/response policy enforcement are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for processing request messages to capture a symmetric policy enforcement context structure and response messages comprising:
    detecting, by a processor, receipt of a request message;
    selecting, by the processor, a policy to apply to the request message;
    enforcing, by the processor, the policy selected to be applied to the request message by determining a policy enforcement processing rule of a rule set that is configured to enforce the policy and executing the policy enforcement processing rule;
    capturing a policy identifier of the policy selected to be applied to the request message into the symmetric policy enforcement context structure based on a name of the policy enforcement processing rule being executed, wherein capturing the policy identifier within the symmetric policy enforcement context structure execution sequence of service level agreements (SLA) and/or service level definitions (SLD) enforceable on the response message;
    storing, by the processor, the symmetric policy enforcement context structure in a memory storage device.

2. The computer-implemented method of claim 1 further comprising:
    adding, by the processor, to the symmetric policy enforcement context structure an existing transactional message context created to manage request message and response message pairs.

3. The computer-implemented method of claim 1, wherein the rule set is a three rule set comprising a request rule, response rule, and fault processing rule.

4. The computer-implemented method of claim 1, further comprising:
    determining, by the processor, whether a response message correlated to the request message has been detected based upon detection of a transaction identifier correlated to the request message and the response message pair; and
    in response to detection of the response message correlated to the request message, retrieving the symmetric policy enforcement context structure.

5. The computer implemented method of claim 4, further comprising:
    identifying, by the processor, a last unprocessed policy in the symmetric policy enforcement context structure;
    identifying, by the processor, a response policy enforcement rule to apply to enforce the last unprocessed policy on the response message; and executing the response policy enforcement rule on the response message.

6. The computer implemented method of claim 5, further comprising:
in response to executing the response policy enforcement rule on the response message, deleting, by the processor, the symmetric policy enforcement context structure from the memory storage device.

7. A computer system comprising:
a processor; and
computer-readable memory storage device coupled to the processor, wherein the computer-readable storage device contains program instructions executing a computer-implemented method comprising:
detecting, by the processor, receipt of a request message;
selecting, by the processor, a policy to apply to the request message;
enforcing, by the processor, the policy selected to be applied to the request message by determining a policy enforcement processing rule of a rule set that is configured to enforce the policy and executing the policy enforcement processing rule;
capturing a policy identifier of the policy selected to be applied to the request message into the symmetric policy enforcement context structure based on a name of the policy enforcement processing rule being executed, wherein capturing the policy identifier within the symmetric policy enforcement context structure execution sequence of service level agreements (SLA) and/or service level definitions (SLD) enforceable on the response message;
storing, by the processor, the symmetric policy enforcement context structure in the computer-readable storage device.

8. The computer system of claim 7, further comprising:
adding, by the processor, to the symmetric policy enforcement context structure an existing transactional message context created to manage request message and response message pairs.

9. The computer system of claim 7, wherein the rule set is a three rule set comprising a request rule, response rule, and fault processing rule.

10. The computer system of claim 7, further comprising:
determining, by the processor, whether a response message correlated to the request message has been detected based upon detection of a transaction identifier correlated to the request message and the response message pair; and
in response to detection of the response message correlated to the request message, retrieving the symmetric policy enforcement context structure.

11. The computer system of claim 10, further comprising:
identifying, by the processor, a last unprocessed policy in the symmetric policy enforcement context structure;
identifying, by the processor, a response policy enforcement rule to apply to enforce the last unprocessed policy on the response message; and
executing the response policy enforcement rule on the response message.

12. The computer system of claim 11, further comprising:
in response to executing the response policy enforcement rule on the response message, deleting, by the processor, the symmetric policy enforcement context structure from the computer-readable storage device.

13. A computer program product comprising:
a computer-readable storage device having computer-readable program instructions stored thereon and said program instructions execute a computer-implemented method comprising:
detecting, by the processor, receipt of a request message;
selecting, by the processor, a policy to apply to the request message;
enforcing, by the processor, the policy selected to be applied to the request message by determining a policy enforcement processing rule of a rule set that is configured to enforce the policy and executing the policy enforcement processing rule;
capturing a policy identifier of the policy selected to be applied to the request message into the symmetric policy enforcement context structure based on a name of the policy enforcement processing rule being executed, wherein capturing the policy identifier within the symmetric policy enforcement context structure execution sequence of service level agreements (SLA) and/or service level definitions (SLD) enforceable on the response message;
storing, by the processor, the symmetric policy enforcement context structure in the computer-readable storage device.

14. The computer program product of claim 13, further comprising:
adding, by the processor, to the symmetric policy enforcement context structure an existing transactional message context created to manage request message and response message pairs.

15. The computer program product of claim 13, wherein the rule set is a three rule set comprising a request rule, response rule, and fault processing rule.

16. The computer program product of claim 13, further comprising:
determining, by the processor, whether a response message correlated to the request message has been detected based upon detection of a transaction identifier correlated to the request message and the response message pair; and
in response to detection of the response message correlated to the request message, retrieving the symmetric policy enforcement context structure.

17. The computer program product of claim 16, further comprising:
identifying, by the processor, a last unprocessed policy in the symmetric policy enforcement context structure;
identifying, by the processor, a response policy enforcement rule to apply to enforce the last unprocessed policy on the response message; and
executing the response policy enforcement rule on the response message.

18. The computer program product of claim 17, further comprising:
in response to executing the response policy enforcement rule on the response message, deleting, by the processor, the symmetric policy enforcement context structure from the computer-readable storage device.

* * * * *